J. H. A. BOUSFIELD.
SCALE BEARING.
APPLICATION FILED MAY 3, 1915.

1,187,965.

Patented June 20, 1916.

Inventor
John H. A. Bousfield

Witnesses
W. K. Ford
Phyllis Colburn

By Whittemore Hulbert & Whittemore
Attorneys

UNITED STATES PATENT OFFICE.

JOHN H. A. BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

SCALE-BEARING.

1,187,965.  Specification of Letters Patent.  Patented June 20, 1916.

Application filed May 3, 1915. Serial No. 25,511.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Scale-Bearings, of which the following is a specification, reference being had therein to the accompanying drawings.

The invention relates to scale bearings particularly designed for use in connection with heavy track scales, and it is the object of the invention to provide automatic adjustment for preserving true alinement between the knife edge pivots and the bearing, and at the same time to obtain a substantial construction for sustaining heavy loads.

Figure 1:
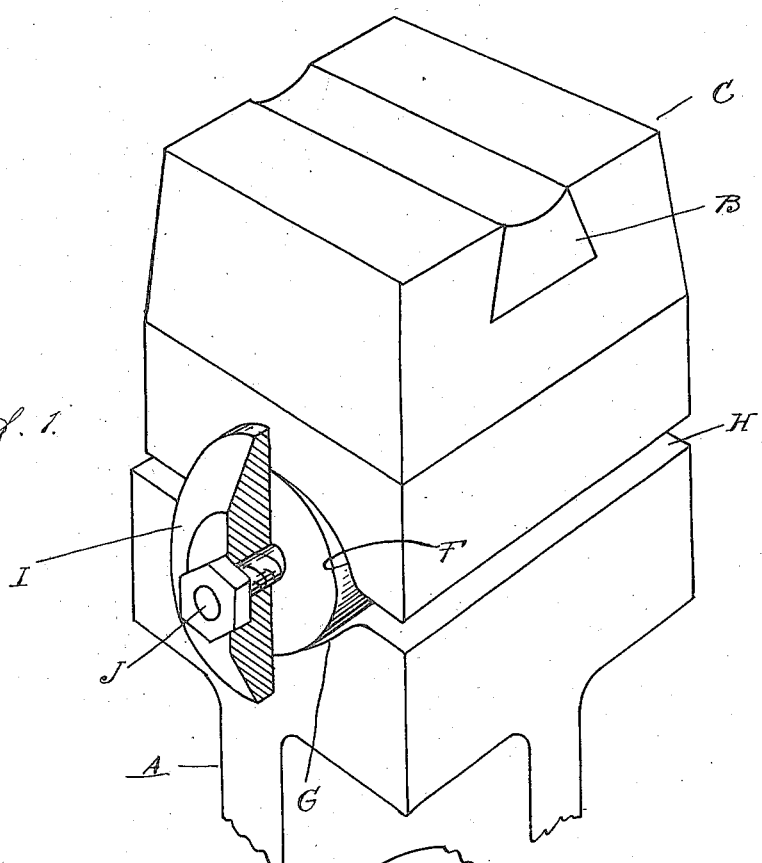
Figure 2:
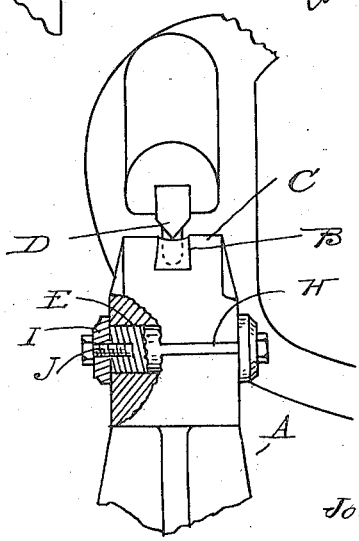

In the drawings: Figure 1 is a perspective view of my improved scale bearing; and Fig. 2 is a section thereof.

A is a supporting stand for the scale bearing, and B is the hardened bearing member, which is secured in a supporting block C. To permit of true alinement between this bearing B and the knife edge pivot D without regard to whether the supporting stand is exactly level, I have provided a rocker bearing of the following construction: E is a cylindrical roll of a length corresponding to that of the top of the stand A and the block C. This roll engages grooves F and G respectively in the block C and stand A, and which are of a radius slightly greater than the radius of the roll. The depth of these grooves is also slightly less than the radius of the roll, so as to leave between the block C and the stand A a narrow space H. The axes of the roll E and grooves F and G are transverse to the line of the knife edge pivot and bearing B, and therefore the rocking permitted by the roll will serve to aline the knife edge and its bearing. To hold the parts from displacement washers I are arranged at opposite ends of the roll and secured thereto by tap screws J or other suitable means. The diameter of these washers is sufficiently greater than that of the roll to form flanges overlapping the ends of the block C and stand A, and this will interlock said parts from lateral displacement.

The bearing constructed as described is capable of sustaining very heavy loads and while permitting of rocking movement to aline the pivot, will prevent lateral displacement in any direction.

What I claim as my invention is:—

1. In a scale, the combination with a supporting stand having a segmental cylindrical groove in its upper portion, of a bearing block for engaging a knife pivot arranged transverse to the axis of said segmental groove, said block being provided with a complementary segmental cylindrical groove, a cylindrical roll engaging said groove and of a radius slightly less than the radius of each of said grooves, and flanges detachably secured to the opposite ends of said roll overlapping the sides of said stand and block.

2. In a scale, the combination with a supporting stand, of a bearing block having a hardened section at the top thereof and a segmental cylindrical groove in the bottom transverse to the axis of said hardened section, a cylindrical roll engaging the groove in said block, and a complementary groove in the upper portion of said stand, and flanges detachably secured to the ends of said roll overlapping the ends of said block and stand and holding the same from relative lateral displacement while permitting a limited rocking movement.

3. In a scale, the combination with a supporting stand having a segmental cylindrical groove in its upper portion, of a bearing block for engaging a knife pivot arranged transverse to the axis of said segmental groove, said block being provided with a segmental cylindrical groove arranged transverse of said knife pivot, a cylindrical roll engaging both of said grooves and of a radius slightly less than the radius of one of said grooves, and means detachably overlapping said supporting stand, cylindrical roll and bearing block, for preventing lateral displacement of the same.

In testimony whereof I affix my signature in presence of two witnesses.

JOHN H. A. BOUSFIELD.

Witnesses:
ERNEST E. HOLBROOK,
OSMAR A. ULLRICH.